United States Patent [19]

Fry et al.

[11] Patent Number: 5,281,440
[45] Date of Patent: Jan. 25, 1994

[54] METHOD OF DEPOSITING A METAL FILM ON A SILYL HYDRIDE CONTAINING SURFACE OF A SOLID AND PRODUCTS PRODUCED THEREBY

[75] Inventors: James L. Fry; Durgesh V. Nadkarni, both of Toledo, Ohio

[73] Assignee: The University of Toledo, Toledo, Ohio

[21] Appl. No.: 861,655

[22] Filed: Apr. 1, 1992

[51] Int. Cl.$^5$ ............... B05D 3/04; B05D 5/10; B01J 37/16; B01J 21/08
[52] U.S. Cl. .................. 427/299; 427/383.3; 427/383.5; 502/253; 502/439
[58] Field of Search ............... 427/383.3, 383.5, 217, 427/8, 299; 502/237, 240, 253, 261, 262, 243, 238, 263, 239, 242, 260, 244, 258, 439

[56] References Cited

U.S. PATENT DOCUMENTS

| | | | |
|---|---|---|---|
| 4,080,284 | 3/1978 | Mitchell | 502/263 X |
| 4,648,975 | 3/1987 | Barkatt et al. | 502/240 X |
| 4,981,659 | 1/1991 | Chuang et al. | 423/235 |
| 4,981,826 | 1/1991 | Speca | 502/116 |
| 5,017,540 | 5/1991 | Sandoval et al. | 502/158 |

OTHER PUBLICATIONS

Kol'tsov, S. I., Aleskovskii, V. B., "The Effect of the Degree of Dehydration of Silica Gel", Russ. J. Phys. Chem., 1967, 41, 336–7.
Budkevich, I. B. et al., "Reduction properties of hydridepolysiloxane Xerogel", Kolloidn. Zh., 1966, 28(1), 21–6 (Russ).

Primary Examiner—W. J. Shine
Assistant Examiner—Douglas J. McGinty
Attorney, Agent, or Firm—Marshall & Melhorn

[57] ABSTRACT

A method of depositing a metal film on a silyl hydride surface of a solid such as silica gel, the solid normally having hydroxyl groups, the metal with a valence of zero being deposited on the surface by reaction of a metal ion in a solution with the hydrogens of the silyl hydrides. The above method is used to easily remove metal ions from a solution and also the method is a basis for determining the number of silyl hydride groups on the surface of the solid.

13 Claims, No Drawings

METHOD OF DEPOSITING A METAL FILM ON A SILYL HYDRIDE CONTAINING SURFACE OF A SOLID AND PRODUCTS PRODUCED THEREBY

The present invention relates to methods of depositing metal with a valance of zero on a silyl hydride containing surface of a solid, the solid surface normally having hydroxyl groups. The invention also relates to products produced by the above described method, to methods of determining the amount of -SiH group, also referred herein as silyl hydride groups, on a solid surface, and to methods of removing metal ions from solution by deposition of the metal on a solid surface formerly containing silyl hydride groups.

BACKGROUND OF THE INVENTION

Solids such as silica gel and alumina normally have hydroxyl groups. U.S. Pat. No. 5,017,540 (Sandoval & Pesek) discloses the preparation of a silica surface with surface silicon hydride groups by replacing the normal hydroxyl groups. One way of modifying a surface of an inorganic oxide is to convert the normal hydroxyl groups to surface hydride groups by reaction with a silane such as trichlorosilane. Reaction of trichlorosilane and silica gel surfaces at elevated temperatures was reported in Kol'tsov S. I., Aleskovskii, V. B., Russ J. Phys. Chem., 1967, 4, 336.

It would be desirable to provide an efficient, well-controlled method of depositing metal with a valence of zero on a solid normally having hydroxyl groups, the metal film produced providing a clean surface for chemical reactions and the metal film being a catalytic film.

OBJECTS OF THE INVENTION

It is an object of the present invention to provide a method of efficiently and cleanly depositing a novel metal film on a silyl-hydride containing surface of a solid such as silica gel and alumina.

It is an object of the present invention to provide a method of removing metal ions from a solution by reacting the metal ions with hydrogens of silyl hydride groups on the surface of a solid to deposit metal ions with a valence of zero on the surface.

It is an object of the present invention to provide a method of determining the number of silyl hydride groups on the surface of a solid by reacting the hydrogens of the silyl hydride groups with metal ions from a solution such as an aqueous silver nitrate solution.

These and other objects will be apparent from the specification that follows and the appended claims.

SUMMARY OF THE INVENTION

The present invention provides a method of depositing a metal film on a silyl hydride containing surface of a solid in which the solid surface normally has hydroxyl groups, the method comprising reacting the hydrogen of the surface silyl hydride groups with a metal ion in water or an organic solvent, the metal being reduced to a metallic state with a valence of zero and deposited on the solid surface formerly having silyl hydride groups.

The above reaction proceeds along the lines of the equation that follows:

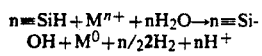

where $n\equiv SiH$ is the surface of the base with silyl hydride groups and n is a small integer that represents the valence of the metal ion.

The present invention also provides products made by the above specified method.

The present invention also provides a method of removing metal ions from an aqueous solution, the method comprising:

providing a silyl hydride-containing surface of a solid that normally has hydroxyl groups, reacting the hydrogen of the silyl hydride group with the metal ion in the solution to deposit the metal with a valence of zero on the solid surface thereby removing the metal ion from the solution.

The present invention also provides a method of determining the number of silyl hydride groups of a solid surface normally having hydroxyl groups, the method comprising:

reacting the hydrogen of the silyl hydride group with a metal ion in water to deposit metal with a valence of zero on the solid surface; and determining the amount of metal ion consumed to deposit the same on the surface and thus determining the number of silyl hydride groups originally on the surface.

DETAILS OF THE INVENTION

In the method of deposition a clean metal film on a silyl hydride containing solid surface, good results have been obtained with a noble metal such as a silver, gold and platinum. Suitable metals are palladium, platinum, rhodium, and transition metals such as cobalt, zinc, titanium, copper, iron, and tantalum. Also suitable are heavy metals such as lead and mercury.

Silica, titania and alumina are the preferred solids, although other solids normally having surface hydroxyl groups can be used such as cellulose, ceramics, metal oxides, zeolites, and alkaline earth metal oxides.

The preferred solution is an aqueous solution. While water is preferred, other solvents such as organic solvents including methanol, ethanol, and propanol, or mixtures thereof with water can be used. When an organic solvent is used with water, it should result in a miscible solution or carrier for the metal ions.

The metal ions are furnished by preferably a salt thereof. For instance, silver is preferably furnished by silver nitrate.

In the reaction of the silyl hydride surface groups with the metal ions, the temperature is preferably room temperature, although if needed or desired, the temperature can be about 40 or 50° or up to about 100° C. The time of reaction is from almost immediate, say 30 seconds to 1 minute up to about 24 to 48 or more hours, and preferably about 20 to 30 hours.

The following examples illustrate the invention:

EXAMPLE 1

Preparation of Trichlorosilane-Treated Silica Gel: Silica gel G (Merck) (40 g) was dried in an oven for 3 days at 140° C. This silica gel was then transferred into a three-necked 3000 ml flask. The flask was equipped with a water condenser, mechanical stirrer and an addition funnel. Trichlorosilane (125 ml., 1.24 mol) in 800 mL of dry $CH_2Cl_2$ was added to the silica gel. The reaction mixture was kept under an argon atmosphere. The reaction mixture was cooled to $-78°$ C. with a dry ice-acetone bath. Pyridine (300 ml., 3.71 mol) was placed in an addition funnel. It was added slowly dropwise to the reaction mixture at $-78°$ C. with intermittent stirring. The reaction was very vigorous and the addition was carried out slowly and carefully. A thick precipitate of pyridinium hydrochloride was obtained in the reaction flask. An additional 400 ml of dry $CH_2Cl_2$ was added to the reaction mixture and the mixture was stirred at room temperature under argon for 24 h. The reaction mixture was then cooled to $-78°$ C. in a dry-acetone bath. Dry methanol was added to the mixture slowly and dropwise (400 ml.) The solution was then filtered on a Buchner funnel and the silica gel was washed further with 1000 ml of dry methanol to dissolve and remove the pyridinium hydrochloride precipitate. Finally, the silica gel was washed with $CH_2Cl_2$ (500 ml). This silica gel was then dried at 110° C. for 8 h under aspirator vacuum. IR (DRIFT) 2253, 2852, 2954, 3563 cm$^{-1}$; $^{29}$Si NMR (CP/MAS) $-74.6$ (Si—H), $-85.0$ (Si—H), $-101.7$, 111.1. mmols of Si-H/g of silica gel = 2.0mmol.

EXAMPLE 2

General Procedure for the Quantitative Estimation of Silyl Hydrides On the Surfaces of Silica Gel and Alumina: The following procedure for the estimation of silyl hydrides on the surface of silica gel is representative.

Silver nitrate crystals were crushed and the powder was dried in an oven at 140° C. for 2 h. Dry silver nitrate (3.75 mmol, 0.6370g) was dissolved in 50 ml of distilled water in a volumetric flask. Silica gel-immobilized hydrosilane (lg) was placed in a 250 ml round-bottomed flask. The silver nitrate solution made above was added to this silica gel. The volumetric flask was rinsed with 20 ml of distilled water and the washings were added to the silica gel. An immediate black precipitation was observed after the addition of the silver nitrate solution to the silica gel-immobilized silyl hydride. The solution was stirred with magnetic stirrer for 24 h. at room temperature. The round-bottomed flask was covered with aluminum foil to avoid exposure to light. The solution was filtered through a Buchner funnel. The silica gel was then washed with 50 ml of distilled water to remove traces of unchanged silver nitrate. To the filtrate were added 5 drops of 1% $HNO_3$. The solution was then warmed to 50°-60° C. Silver chloride was precipitated out by adding 0.2M aqueous HCl solution dropwise to the filtrate (unchanged silver nitrate solution). During the precipitation, the temperature was kept at around 50°-60° C. The precipitate was allowed to settle in the flask in a dark place for 2 h at room temperature. The supernatent liquid was tested for further precipitation with aqueous HCl solution. The precipitate was allowed to settle in the flask in a dark place overnight (12-16 h). The silver chloride precipitate was then filtered through a preweighed Gooch sintered crucible (30 mL, Pyrex, F) under aspirator vacuum. The precipitate was then washed with 20-25 mL of dilute $HNO_3$ solution (0.2 ml of concentrated $HNO_3$ diluted to 200 ml with distilled water). This was followed by washing with 100 ml of distilled water. The precipitate was dried in an oven at 140° C. for 24 h and then weighed. The amount of Si-H on the solid surface was calculated as follows:

Weight of silver chloride precipitate = 0.2422 g mmoles of silver chloride = mmoles of unchanged silver nitrate = 1.69 mmoles mmoles of silver nitrate started with (3.75 mmoles) — mmoles of unchanged silver nitrate (1.69 mmoles) = (2.06) mmoles of silver nitrate consumed.

mmoles of silver nitrate consumed = mmoles of Si—H present/g of silica gel = 2.06 mmoles

EXAMPLE 3

Preparation of Chlorodimethylsilane-Treated Silica Gel: The procedure used was the same as above. Dry silica gel (15 g) was reacted with chlorodimethylsilane (Aldrich) (40.0 ml., 0.375 mol) in the presence of pyridine (30.0 ml, 0.375 mol) in dry $CH_2Cl_2$ (1000 ml). The reaction mixture was stirred under argon for 24 h at room temperature. The silica gel was then washed with methanol (700 ml) followed by $CH_2Cl_2$ (300 ml) and then dried at 110° C. for 8 h under aspirator vacuum in a drying pistol.

IR (DRIFT) 2150, 2920, 2960, 3617 CM$^{-1}$, $^{29}$Si NMR (CP/MAS) $-101.6$, $-111.0$, $-2.1$ (Si—H). The amount of Si—H on the solid surface was determined as described above.

Weight of the silver chloride precipitate = 0.4041 g.

mmoles of silver chloride = mmoles of unchanged silver nitrate = 2.28 mmoles mmoles of silver nitrate started with (3.75 mmoles) — mmoles of unchanged silver nitrate (2.82) mmoles = 0.93 mmoles of silver nitrate consumed.

mmoles of silver nitrate consumed = mmoles of Si—H present/g of silica gel = 1.90 mmoles.

EXAMPLE 4

Preparation of Alumina-Immobilized Trichlorosilane: The procedure used was the same as above. Neutral alumina (Brockman activity I) (Fisher) was dried in an oven at 140° C. for 3 days. This alumina (15g) was treated with trichlorosilane (30.0 ml, 0.165 mol) in 300 ml of dry $CH_2Cl_2$ in the presence of dry pyridine (40.0 ml, 0.495 mol). The alumina was then washed with 500 ml of dry methanol followed by 30 ml of dry $CH_2Cl_2$. Finally it was dried at 100° C. for 8 h under aspirator vacuum. IR (DRIFT) 2238, 2855, 2965, 3419 Cm$^{-1}$; $^{29}$SiNMR (CP/MAS)) $-75$, $-80$, $-84$. The amount of Si—H on the solid surface was determined as described above.

Weight of the silver chloride precipitate = 0.50g.

mmoles of silver chloride = mmoles of unchanged silver nitrate = 3.49 mmoles mmoles of silver nitrate started with (3.75 mmoles) — mmoles of unchanged silver nitrate (3.49 mmoles) = 0.26 mmoles of silver nitrate consumed.

mmoles of silver nitrate consumed = mmoles of Si—H present/ g of alumina = 0.52 mmoles.

EXAMPLE 5

Preparation of the Selective Palladium Catalyst on Silica Gel Partially Poisoned with Mercury: Palladium chloride ($PdCl_2$, 0.010 g, 056mmol) was dissolved in 40 ml of reagent grade methanol and trichlorosilane-treated silica gel (1 g, 2 mmol) was added to it. An immediate black precipitation was observed. The reaction mixture was magnetically stirred for 24 h at room temperature. The silica gel was filtered and washed with methanol (50 mL). The filtrate was concentrated on a rotary evaporator to about 10 ml of the volume. The filtrate was yellowish in color and probably contained some unchanged palladium chloride. An excess of sodium borohydride was added to this solution until the yellow color disappeared. An immediate black precipitation of Pd metal was observed. The solution was centrifuged in a preweighed centrifuge tube and the palladium metal was washed repeatedly with methanol (5×20 ml), the Pd metal was then dried under vacuum and until the constant weight was attained.

Weight of the Pd metal in 0.01 g of PdCl$_2$ =0.006 g
Weight of Pd metal recovered=0.003 g
Weight of Pd metal on 1 g of silica gel=0.003 g. 0.3% w/w of Pd/SiO$_2$ The Pd metal on the silica gel which was then added to the aqueous mercurous sulfate (Hg$_2$SO$_4$) solution (1.2 mg of mercurous sulfate dissolved in 50 ml of distilled water). The reaction mixture was stirred for 7 h at room temperature. The mixture was filtered and the silica gel was washed with 100 ml of distilled water followed by 100 ml of methanol. The catalyst (Pd-Hg/SiO$_2$) made in this manner was dried on the Buchner funnel for 2 h under aspirator vacuum and then in an oven at 75° C. for 4 h. The catalyst was stored in a vial with a tightly closed cap.

EXAMPLE 6

A General Procedure For the Partial Hydrogenation of Alkynes to Alkenes Using Pd-Hg/SiO$_2$ Catalyst: The following procedure is representative. Hydrogenation of Diphenylacetylene: Diphenylacetylene (Aldrich) (0.089 g., 0.50 mmol) was dissolved in 15 ml of reagent grade hexane in a 100 ml round-bottomed flask. The catalyst (50 mg) was added to the flask. The hydrogenation apparatus and the flask were evacuated with aspirator vacuum and then the hydrogen gas was introduced. Hydrogenation was carried out at 1 atm of pressure and until 1 equivalent of hydrogen was absorbed. The reaction mixture was then filtered through Celite and washed with hexane (25 ml). GC/MS analysis showed cis-stilbene as the major product. The solvent was removed under reduced pressure to yield a colorless oil. The mass balance was almost quantitative (0.093g). From the proton NMR analysis, following products and their percent yields were observed:

Cis-stilbene (85%): $^1$H NMR (CDCl$_3$) 6.65 (s,2H), 7.2-7.35 (m, 10 H); MS (EI) 180 (M+, 93), 179 (100) 178 (70), 165 (54), 152 (18), 89 (29), 76 (23), 51 (16).

Trans-stilbene (3%): 1H NMR (CDCl$_3$) 7.16(s, 2 H), 7.29-7.58 (m, 10 H); MS (EI) 180 (M+, 92), 178 (63), 165 (49), 152 (12), 89 (31), 77 (10), 76 (22)

Bibenzyl (12%): $^1$H NMR (CDCl$_3$) 3.0 (s, 4 H), 7.15 (s, 10 H); MS (EI) 182 (M+53), 165 (4), 152 (2), 92 (9), 91 (100), 65 (20), 28 (14).

As previously indicated, it has been discovered that the surface-immobilized silyl hydride groups served as local reducing sites to cause the deposition of metals on the solid surfaces in a very clear and uniform manner to produce new catalysts (metal film/solid structures) for industrial chemical processes. Generally, the thickness of the metal film is on an atomic order. The metal film can be deposited on the inside surface of a chemical reaction vessel, the inside metal film being a catalyst surface or itself one of the reactants. Very clean chemical reactions are performed in which only a single filtrate is required to separate the product from by products. The surfaces of the solids can be altered to make them biologically inert. Also advantageously, toxic and/or expensive metal salts can be efficiently removed from large volumes of solvents, especially aqueous solution effluent.

What is claimed is:

1. A two-step method of depositing, on a surface of a solid, a metal film on a solid surface that normally has hydroxyl groups, the solid and the solid surface being equivalent to a solid that has a refractive oxide structure that is silica, alumina or titania, the method consisting of the steps of:
   A. reacting the hydroxyl groups of the solid surface with a silyl hydride to provide a controlled number of -SiH groups on the solid surface; and
   B. reacting the -SiH groups of the solid surface from step A with a metal salt solution containing an amount of metal sufficient to react with a desired amount of —SiH groups to reduce the metal to a valence of zero to deposit metal with a valence of zero on the surface of the solid.

2. A two-step method as defined in claim 1, in which the silyl hydride is a di- or tri- chlorosilane.

3. A method as defined in claim 1, in which the solid is silica.

4. A method as defined in claim 1, in which the solid is alumina.

5. A method as defined in claim 1, in which all the SiH groups on the solid surface from step A are reacted with the metal salt to provide a metal film on the surface with metal having a valence of zero.

6. A two-step method of depositing a metal film on a solid surface normally having hydroxyl groups, the method consisting essentially of:
   A. reacting hydroxyl groups of the solid with a di or tri chlorosilane to provide a controlled number of —SiH group on the surface using an amount of the silane that is equivalent to bout 0.33 mol of trichlorosilane per gram of silica to provide a solid surface with about 2 mmols of -SiH groups per gram of silica; and
   B. reacting the solid surface containing —SiH group from step A with a metal salt solution using an amount of metal salt equivalent to about 3.75 mmols of silver nitrate per gram of silica to reduce the valence of the metal to zero and deposit metal on the solid surface in an amount of about 0.93 mmol of silver nitrate.

7. A two-step method as defined in claim 6, in which the di or tri chlorosilane is trichlorosilane.

8. A method as defined in claim 6, in which the solid is silica.

9. A method as defined in claim 6, in which the solid is alumina.

10. A method as defined in claim 6, in which all the SiH groups on the solid surface from step A are reacted with the metal salt to provide a metal film on the surface with metal having a valence of zero.

11. A two-step method of depositing a metal film on a solid having an interior oxide structure and having a surface that normally has hydroxyl groups, the method consisting of the steps of:
   A. reacting hydroxyl groups of the solid with a silyl hydride to provide a controlled number of —SiH group on the surface, the solid having the —SiH group on the surface; and
   B. reacting —SiH groups on the surface of the solid produced by step A with a controlled amount, depending upon the number —SiH groups, of a metal salt solution sufficient to deposit on the surface of the solid metal with a valence of zero, each of the —SiH groups on the surface reducing the one atom of metal to a valence of zero.

12. A method as defined in claim 11, in which the surface of a solid is part of a reaction vessel.

13. A two-step method of depositing, on a surface of a solid, a metal film on a solid surface that normally has hydroxyl groups, the solid and the solid surface being equivalent to a solid that has a refractive oxide structure that is silica, alumina or titania, the method consisting of the steps of:

A. reacting the hydroxyl groups of the solid surface with a silyl hydride to provide a controlled number of —SiH groups on the solid surface; and B. reacting the —SiH groups of the solid surface from step A with a metal salt solution containing an amount of metal sufficient to react with a desired amount of —SiH groups to reduce the metal to a valence of zero to deposit metal with a valence of zero on the surface of the solid.

* * * * *